United States Patent [19]
Grimm

[11] 3,963,184
[45] June 15, 1976

[54] DEVICE FOR CONVERTING A CONVENTIONAL LAWN MOWER TO A LEAF SHREDDER

[75] Inventor: Helmut Grimm, Mountainside, N.J.

[73] Assignee: The Raymond Lee Organization, Inc., a part interest

[22] Filed: Apr. 28, 1975

[21] Appl. No.: 572,162

[52] U.S. Cl............................ 241/101.1; 241/101.7; 241/190; 241/243
[51] Int. Cl.² ......................................... B02C 18/10
[58] Field of Search........... 241/101.1, 101.2, 101.7, 241/188 R, 189 R, 190, 222, 243; 56/13.3, 13.4, 16.9, 17.5

[56] References Cited
UNITED STATES PATENTS

| | | | |
|---|---|---|---|
| 3,240,247 | 3/1966 | Lautzenheiser | 241/101.7 |
| 3,286,376 | 11/1966 | Wildes | 56/16.9 X |
| 3,526,261 | 9/1970 | Ivey | 241/101.7 X |
| 3,527,278 | 9/1970 | Johnson | 241/101.2 |
| 3,908,913 | 9/1975 | Cushman | 241/101.7 |

*Primary Examiner*—Granville Y. Custer, Jr.
*Assistant Examiner*—Howard N. Goldberg

[57] ABSTRACT

A plate is detachably securable to the bottom of a conventional lawn mower. The plate covers approximately half of the bottom but leaves the portion open at the rear. A specifically altered cutting blade of the mower, driven by the motor, rotates over the top of the blade. Fixed blades attached to each end of the rotating blade cooperate with fixed fingers fixed to the plate to shred leaves picked up by the mower. The mower, with the device attached, can be placed on top of a stand that has an open front into which leaves may be raked. Thus, a fixed leaf shredder is formed, into which piles of leaves can be raked for efficient shredding and bagging.

4 Claims, 5 Drawing Figures

DEVICE FOR CONVERTING A CONVENTIONAL LAWN MOWER TO A LEAF SHREDDER

SUMMARY OF THE INVENTION

This invention is directed towards a device that can conveniently convert a conventional lawn mower to a leaf shredder, without hampering the lawn mower in any way from fulfilling its original function while the device is in place or when the device has been removed. Furthermore, the invention allows the mower to be mobile during use for thin coverings of leaves in conjunction with cutting grass but allows it to be quickly convertible for fixed use, when big piles of leaves are to be shredded.

Thus, a plate is detachably secured to the bottom of a conventional lawn mower. The plate covers the front half of the bottom, but leaves a rear portion open to allow leaves to be picked up. An altered mower blade, driven by the motor, rotates above the plate. Fixed blades attached to the ends of the mower blade pass through gaps between fixed fingers when the mower blade rotates, catching leaves between the fingers and shredding them, before they are blown out the exhaust chute into a bag, in conventional fashion.

If the invention is to be used to shred piles of leaves, a stand can be used to support the mower with the plate attached. This stand has an open front into which leaves can be raked, to be sucked up into the mower for shredding and bagging. The stand thus presents a larger opening into which leaves can easily be raked, enabling the user to avoid burrowing the mower through large piles of leaves.

DETAILED DESCRIPTION OF PREFERRED EMBODIMENTS

Figure 1:
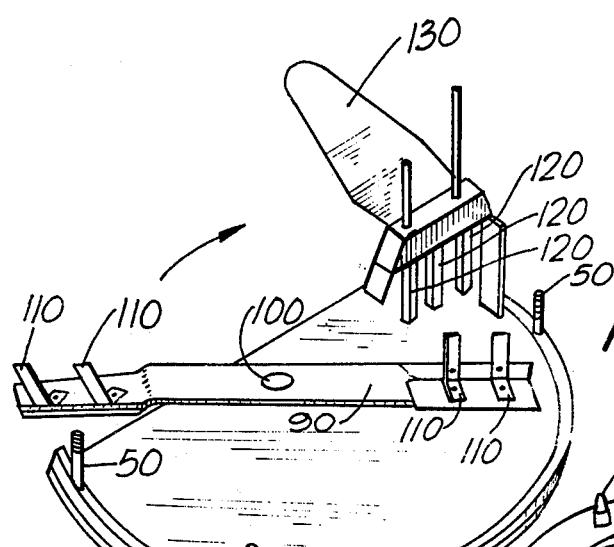
FIG. 1 shows the plate assembly for use in the invention.
Figure 2:
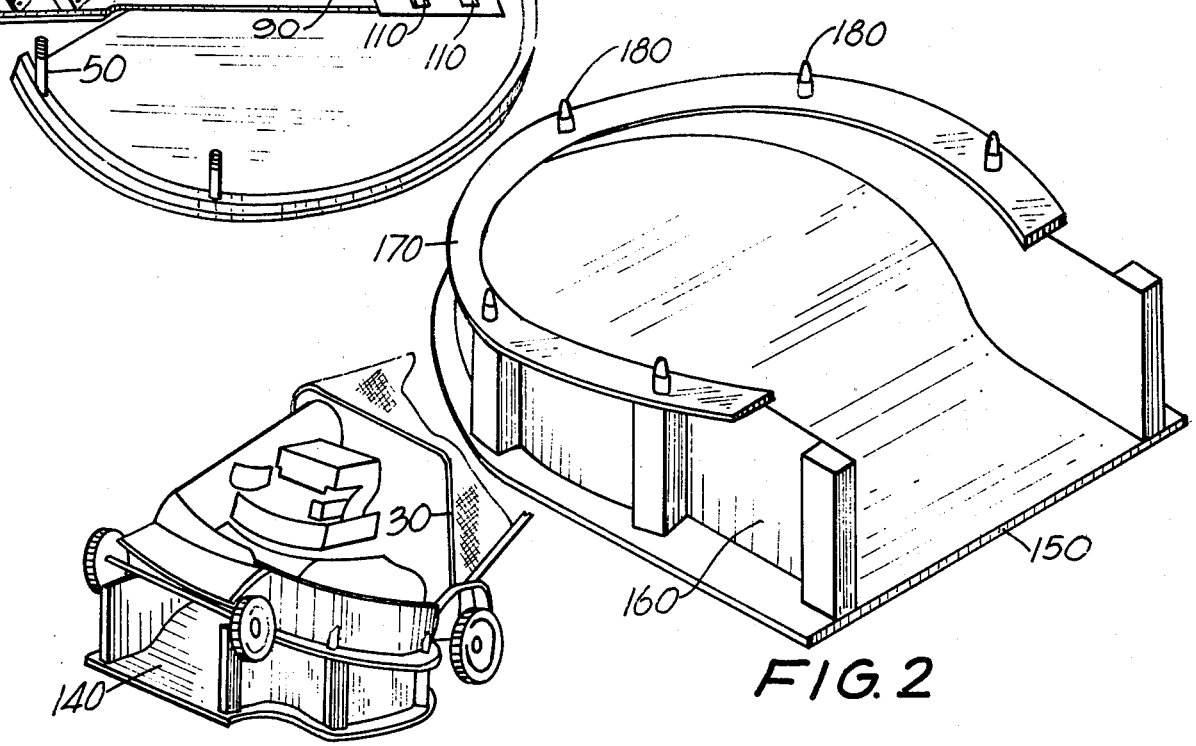
FIG. 2 shows the stand for use in the invention.

A conventional motorized lawn mower 10 has an open bottom into which grass, leaves and the like are sucked by air pressure generated by a horizontal rotating blade 90. These items are then ejected through exhaust chute 20 and thence into bag 30 or other suitable container.

A generally flat plate is detachably securable to the bottom of the mower by bolts 50 that can be threaded into holes 60 in flanges 70 that are placed on the housing 80 of the mower. The plate generally takes the form of a circular disc truncated by a non-diametrical chord. This disc, when it is attached to the bottom of the mower, covers the front half of the bottom, leaving only the rear portion open, up to the transversely extending straight edge of the plate. It is through this rear portion that leaves may be drawn up.

An altered mower blade 90 is secured to the motor shaft of the lawn mower, rotating in a plane parallel to the plate. At each end of the blade is located a pair of like fixed blades 110 that extend upwardly and rearwardly from the blade 90, and are symmetrically disposed on either side of the mounting hole 100. As this blade rotates in the direction shown by an arrow in FIG. 1, the blades 110 pass between three like, straight, downwardly extending fixed fingers 120 that are suspended above the plate so as to allow the blade 90 to rotate beneath them. As leaves are forced between the fingers by blades 110, they are shredded. Of course, more sets of fingers may be used in tandem for finer shredding.

The fingers are located at the rear right hand corner of the plate, so as not to block the exhaust chute 20 through which the shredded leaves will ultimately be ejected. An upwardly and rearwardly extending flange 130 is attached to the top of the fingers, to direct leaves thereto.

Figure 3:
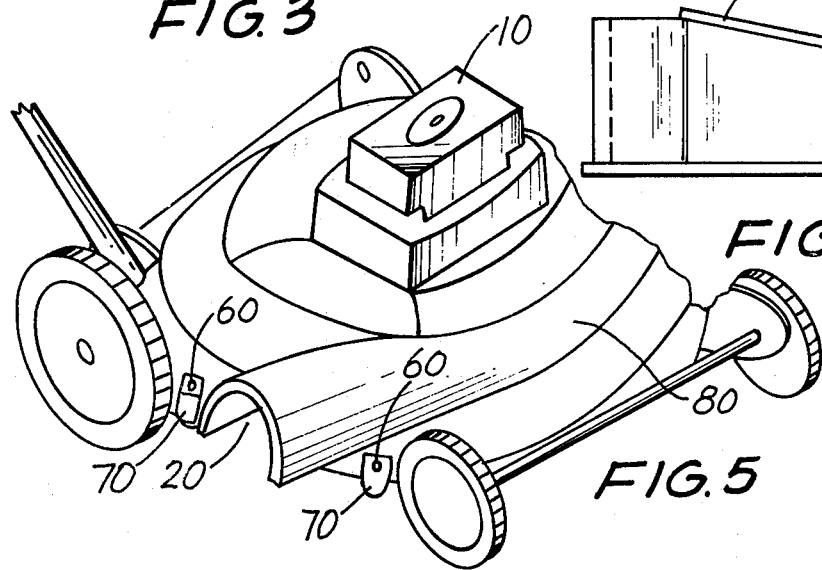
FIG. 3 shows the invention in use.
Figure 4:
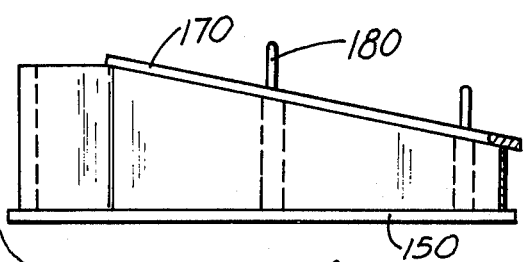
FIG. 4 shows a side cross section of the stand.
Figure 5:
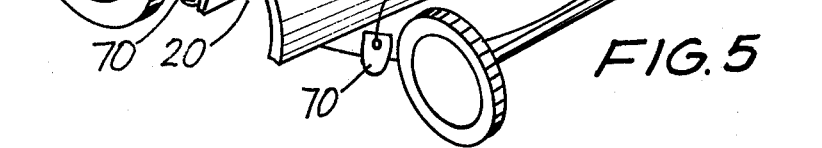
FIG. 5 shows the invention in use without the stand attached.

When the invention is to be used to shred piles of leaves, a stand is used as in FIG. 3, to provide a convenient front opening 140 into which leaves may be raked. This stand has a flat horizontal bottom 150 surrounded by a vertically extending sidewall 160 that has generally the shape of a horseshoe, surrounding the rear and sides of the stand but leaving the front open. The top surface 170 at the top of the wall slants downwardly and rearwardly, and has prongs 180 projecting upwardly therefrom. The prongs surround the housing of the mower, to keep the mower supported in a tilted position while preventing it from sliding off the stand.

While the invention has been described with detailed reference to the drawings, the protection sought is to be limited only by the terms of the claims which follow.

What is claimed is:

1. A detachable device for converting a conventional motorized lawn mower to a leaf shredder, comprising:
    a generally flat plate with a periphery taking the shape of a circle truncated by a non-diametrical chord, the plate being detachably securable to the bottom of a conventional lawn mower with the straight portion of the periphery extending transversely across the bottom, so as to expose the rear portion of the bottom of the mower;
    an altered mower blade secured at its center to the shaft of the lawn mower and rotating in a plane parallel to the plate;
    two like pairs of like fixed blades, each pair disposed at a corresponding end of the mower blade with the pairs being symmetrically disposed about the center of the blade, and with each fixed blade extending upwardly and rearwardly from its point of attachment to the mower blade; and
    three like, spaced, straight, fixed fingers suspended above the plate and extending downwardly theretowards, in a manner that the rotating blade can carry each pair of symmetrically mounted blades between the fingers through the spaces therebetween and to shred leaves caught between the fingers and symmetrically mounted blades.

2. The device of claim 1 further comprising a stand with a horizontal bottom, an open front, a vertically extending peripheral sidewall extending upwardly from the bottom around the sides and rear in a shape generally similar to that of a horseshoe, and a flat downwardly and rearwardly extending top surface, whereby a conventional lawn mower to which the device of claim 1 has been secured can be placed on top of the stand to shred leaves that are raked into the front of the stand.

3. The device of claim 2 wherein the fingers are located at the rear right hand corner of the plate, as viewed from the top.

4. The device of claim 3 wherein an upwardly and rearwardly extending flange is attached to the tops of the fingers.

* * * * *